United States Patent
Flint et al.

(10) Patent No.: US 11,354,907 B1
(45) Date of Patent: *Jun. 7, 2022

(54) SONIC SENSING

(71) Applicant: Vivint, Inc., Provo, UT (US)

(72) Inventors: Jason C. Flint, Highland, UT (US);
Christopher Lee Harris, Holladay, UT (US); Craig Matsuura, Draper, UT (US)

(73) Assignee: VIVINT, INC., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,006

(22) Filed: Mar. 3, 2020

Related U.S. Application Data

(63) Continuation of application No. 15/233,035, filed on Aug. 10, 2016, now Pat. No. 10,579,879.

(51) Int. Cl.
| | |
|---|---|
| *G06K 9/00* | (2022.01) |
| *H04N 5/247* | (2006.01) |
| *G10L 25/51* | (2013.01) |
| *H04R 29/00* | (2006.01) |
| *H04R 1/08* | (2006.01) |
| *H04N 5/232* | (2006.01) |
| *H04R 1/32* | (2006.01) |
| *G06V 20/52* | (2022.01) |

(52) U.S. Cl.
CPC ............ *G06V 20/52* (2022.01); *G10L 25/51* (2013.01); *H04N 5/232* (2013.01); *H04N 5/23206* (2013.01); *H04N 5/247* (2013.01); *H04R 1/326* (2013.01); *H04R 2430/20* (2013.01)

(58) Field of Classification Search
None
See application file for complete search history.

(56) References Cited

U.S. PATENT DOCUMENTS

| | | | |
|---|---|---|---|
| 4,789,941 A | 12/1988 | Nunberg | |
| 5,473,368 A | 12/1995 | Hart | |
| 6,862,253 B2 | 3/2005 | Blosser et al. | |
| 7,064,664 B2 | 6/2006 | Lerg et al. | |
| 7,106,193 B2 | 9/2006 | Kovach | |
| RE44,527 E | 10/2013 | Aviv | |
| 8,700,392 B1 | 4/2014 | Hart et al. | |
| 9,152,886 B2 * | 10/2015 | Sakai | G06K 9/00342 |
| 10,326,921 B2 | 6/2019 | Chien | |
| 2004/0081020 A1 | 4/2004 | Blosser et al. | |
| 2005/0248233 A1 | 11/2005 | Pompei | |
| 2006/0007308 A1 * | 1/2006 | Ide | H04N 5/23218 348/143 |
| 2006/0045312 A1 | 3/2006 | Bernstein et al. | |
| 2007/0152807 A1 | 7/2007 | Huang et al. | |
| 2007/0172083 A1 * | 7/2007 | Tseng | H04N 7/14 381/104 |

(Continued)

*Primary Examiner* — Mohammad J Rahman
(74) *Attorney, Agent, or Firm* — Kunzler Bean & Adamson, PC

(57) ABSTRACT

A method for security and/or automation systems is described. In one embodiment, the method may include receiving image data associated with an area via an image sensor, receiving sound data associated with an object via an audio sensor, analyzing the image data in relation to the sound data, detecting an object's presence based at least in part on the analyzing, and identifying at least one characteristic relating to the object based at least in part on the detecting.

15 Claims, 8 Drawing Sheets

(56) References Cited

U.S. PATENT DOCUMENTS

| | | | |
|---|---|---|---|
| 2008/0074380 A1* | 3/2008 | Owyeung | H04N 5/2354 345/102 |
| 2009/0163812 A1 | 6/2009 | Chouno | |
| 2009/0300500 A1 | 12/2009 | Arrasvuori | |
| 2010/0124408 A1* | 5/2010 | Maeoka | H04N 5/765 386/329 |
| 2010/0191074 A1 | 7/2010 | Chou | |
| 2011/0050944 A1* | 3/2011 | Nakamura | H04N 13/296 348/222.1 |
| 2011/0102619 A1* | 5/2011 | Niinami | H04N 5/23219 348/222.1 |
| 2011/0216179 A1* | 9/2011 | Dialameh | G06K 9/00664 348/62 |
| 2012/0062729 A1 | 3/2012 | Hart et al. | |
| 2012/0149350 A1 | 6/2012 | Fan et al. | |
| 2012/0206452 A1 | 8/2012 | Geisner et al. | |
| 2012/0314066 A1 | 12/2012 | Lee et al. | |
| 2013/0049950 A1 | 2/2013 | Wohlert | |
| 2013/0176414 A1 | 7/2013 | Hwang et al. | |
| 2013/0200207 A1 | 8/2013 | Pongratz et al. | |
| 2013/0230180 A1 | 9/2013 | Thormundsson et al. | |
| 2013/0232717 A1 | 9/2013 | Lee et al. | |
| 2013/0250078 A1* | 9/2013 | Levy | A61F 9/08 348/62 |
| 2014/0068661 A1* | 3/2014 | Gates, III | H04N 21/441 725/34 |
| 2014/0086551 A1 | 3/2014 | Kaneko | |
| 2014/0273989 A1 | 9/2014 | Oswald | |
| 2014/0280538 A1 | 9/2014 | Oswald | |
| 2014/0280933 A1 | 9/2014 | Oswald | |
| 2014/0292545 A1 | 10/2014 | Nemoto | |
| 2015/0002293 A1 | 1/2015 | Nepo | |
| 2015/0057111 A1 | 2/2015 | Tremblay-Munger et al. | |
| 2015/0131966 A1 | 5/2015 | Zurek et al. | |
| 2015/0278606 A1 | 10/2015 | Laksono et al. | |
| 2015/0312662 A1 | 10/2015 | Kishimoto et al. | |
| 2015/0318020 A1 | 11/2015 | Pribula | |
| 2015/0379770 A1 | 12/2015 | Haley et al. | |
| 2016/0042740 A1* | 2/2016 | Jiang | G10L 19/008 381/23 |
| 2016/0052547 A1 | 2/2016 | Kashiwai | |
| 2016/0100086 A1 | 4/2016 | Chien | |
| 2016/0144788 A1* | 5/2016 | Perrin, III | B60R 1/00 348/148 |
| 2016/0170996 A1* | 6/2016 | Frank | G06F 16/24578 707/748 |
| 2016/0189392 A1* | 6/2016 | Tsuji | G06T 7/248 382/103 |
| 2016/0257252 A1 | 9/2016 | Zaitsev et al. | |
| 2016/0275790 A1 | 9/2016 | Kang et al. | |
| 2016/0275796 A1 | 9/2016 | Kim et al. | |
| 2016/0364561 A1 | 12/2016 | Lee | |
| 2017/0019744 A1* | 1/2017 | Matsumoto | G06K 9/209 |
| 2017/0048611 A1 | 2/2017 | Wu et al. | |
| 2017/0115948 A1* | 4/2017 | Leem | G06F 3/165 |
| 2017/0180348 A1 | 6/2017 | Piccolotto et al. | |
| 2017/0193970 A1* | 7/2017 | Takahashi | G09G 5/00 |
| 2017/0358095 A1* | 12/2017 | Levy | G01R 33/307 |
| 2018/0048976 A1 | 2/2018 | Kimura et al. | |
| 2018/0203663 A1* | 7/2018 | Lehtiniemi | G06F 3/162 |
| 2018/0285673 A1 | 10/2018 | Arnold et al. | |
| 2019/0228235 A1* | 7/2019 | Murad | G06K 9/00791 |
| 2019/0394423 A1* | 12/2019 | Ishige | H04N 5/2628 |
| 2020/0053404 A1* | 2/2020 | Hall | H04N 21/21805 |
| 2020/0114931 A1* | 4/2020 | Rao | G06K 9/00892 |

* cited by examiner

SONIC SENSING

CROSS REFERENCE

This application is a continuation of U.S. patent application Ser. No. 15/233,035, entitled "SONIC SENSING," which was filed Aug. 10, 2016, and assigned to the assignee hereof and incorporated herein by reference.

BACKGROUND

The present disclosure, for example, relates to security and/or automation systems, and more particularly to sonic sensing.

Security and automation systems are widely deployed to provide various types of communication and functional features such as monitoring, communication, notification, and/or others. These systems may be capable of supporting communication with a user through a communication connection or a system management action.

Security cameras and other devices positioned outside a premises, such as at a front door of a home or business, may be set to trigger notifications upon detecting motion. Such security cameras, however, may trigger false positives that induce false alarms.

SUMMARY

The disclosure herein includes methods and systems for improving the detection of objects in relation to a camera's field of view at a premises, thereby improving notification regarding such notifications and reducing false alarms. In some embodiments, the present systems and methods may appropriately distinguish between detected motion from passing vehicles, motion from pedestrians walking on a sidewalk past the premises, trees swaying, and events actually relating to a premises. These distinguishing detections may prevent a user from receiving several false alarms for motion at the entrance of the premises.

A method for security and/or automation systems is described. In one embodiment, the method may include receiving image data associated with an area via an image sensor, receiving sound data associated with an object via an audio sensor, analyzing the image data in relation to the sound data, detecting an object's presence based at least in part on the analyzing, and/or identifying at least one characteristic relating to the object based at least in part on the detecting.

In some embodiments, the method may include estimating a distance from the audio sensor to a detected sound associated with the object and determining whether the distance satisfies a distance threshold. In some cases, the audio sensor detects ultrasonic sound. In some cases, the method may include identifying a type of the detected sound. Identifiable types of sound may include, but are not limited to, a footstep, a voice, a horn of a vehicle, an engine of a vehicle, a knocking on a door, a ringing of a doorbell, an opening of a door, a rustling of clothing, a gunshot, a glass breaking, a rattling of keys, and/or the like. In some cases, estimating the distance from the audio sensor to the detected sound may be based at least in part on identifying the type of the detected sound. In some embodiments, the method may include generating a notification based at least in part on one or more characteristics and/or determinations, including determining the type of the detected sound.

In some embodiments, the method may include estimating a size of a source of the detected sound relative to a field of view of the image sensor based at least in part on at least one of the distance and/or the type of the detected sound. In some cases, the method may include adjusting at least one characteristic of an automation component based at least in part on determining whether the distance satisfies the distance threshold. In some cases, the automation component may include at least one of a motion sensor, the image sensor, a lock, a light, and the audio sensor, etc. In some cases, the audio sensor may include an active audio sensor. In some cases, the audio sensor may include a passive audio sensor. In some cases, the method may include adjusting at least one characteristic of the image sensor based at least in part on the distance and capturing image data of the area after the adjusting at least one characteristic of the image sensor. In some embodiments, the method may include estimating a location of the detected sound. In some cases, the method may track a source of the detected sound based at least in part on a subsequent detected sound.

An apparatus for security and/or automation systems is also described. In one embodiment, the apparatus may include a processor, memory in electronic communication with the processor, and instructions stored in the memory, the instructions being executable by the processor to perform the steps of receiving image data associated with an area via an image sensor, receiving sound data associated with an object via an audio sensor, analyzing the image data in relation to the sound data, detecting an object's presence based at least in part on the analyzing, and/or identifying at least one characteristic relating to the object based at least in part on the detecting.

A non-transitory computer-readable medium is also described. The non-transitory computer readable medium may store computer-executable code, the code being executable by a processor to perform the steps of receiving image data associated with an area via an image sensor, receiving sound data associated with an object via an audio sensor, analyzing the image data in relation to the sound data, detecting an object's presence based at least in part on the analyzing, and/or identifying at least one characteristic relating to the object based at least in part on the detecting.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
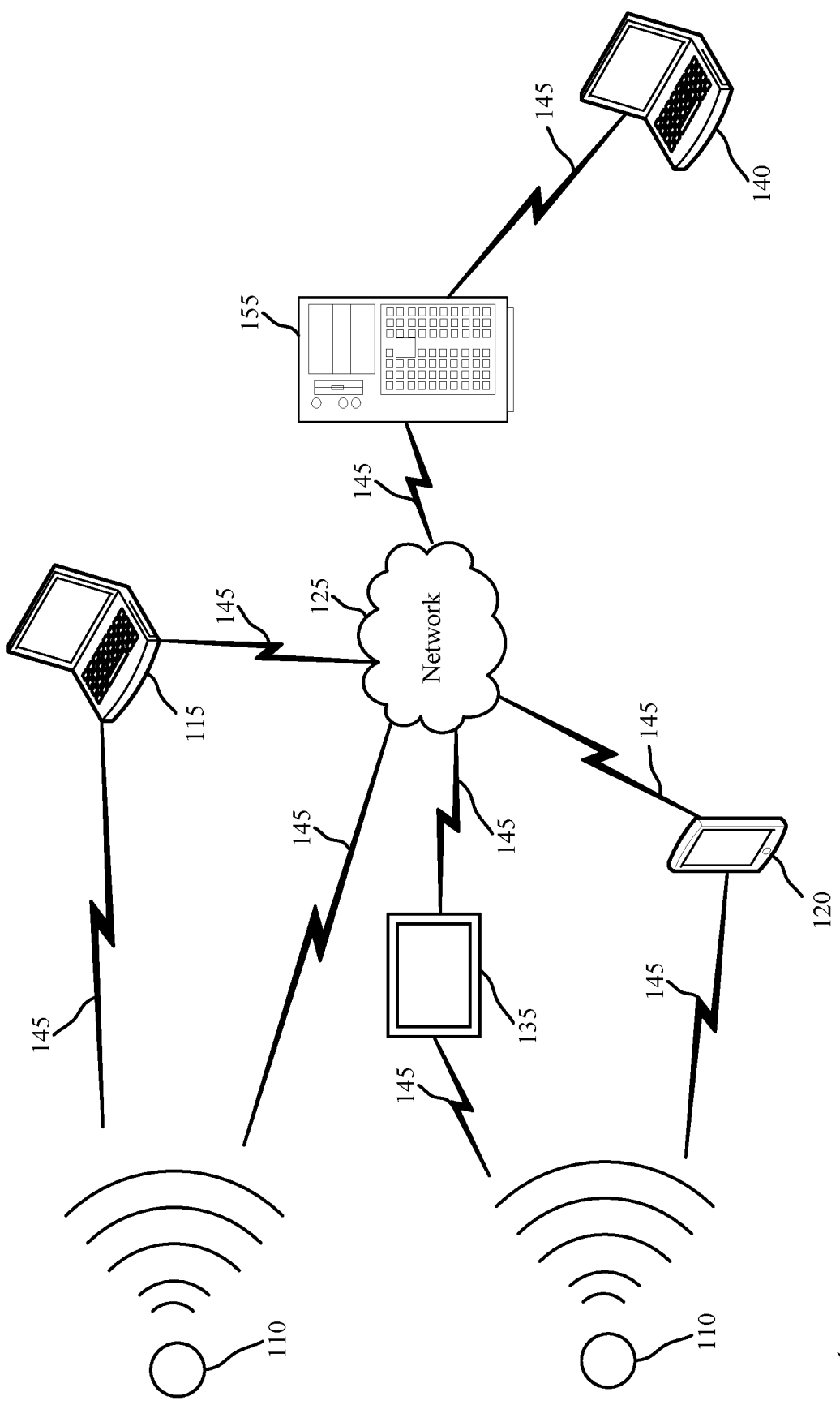
FIG. 1 is a block diagram of an example of a security and/or automation system in accordance with various embodiments.

The following relates generally to automation and/or security systems. Automation systems may include one or more sensors located at an entrance to a premises. For example, sensors located at the entrance may include a camera sensor, a motion sensor, a proximity sensor, and/or an audio sensor, among others.

A motion sensor at the entrance may be configured to detect motion and generate an alert. In some cases, the motion sensor may generate notifications based on false alarms. For example, the motion sensor may detect a person or an animal walking or moving past the premises, a vehicle passing by the premises, a tree blowing in the wind, etc., and a notification may be generated based on this detected motion producing an improper alarm. Improper alarms are detrimental because it reduces the system's accuracy and they also may deter customers from incorporating, enabling, and/or electing to have such features in their security and/or automation system.

An image sensor at the entrance may be configured to capture one or more images of a person at the entrance. For example, an occupant of the premises may approach the entrance and enter the premises, a visitor may approach the entrance and knock on a door at the entrance, and/or a delivery person may approach the entrance to deliver a package. A camera sensor positioned to capture an area associated with the entrance to the premises may be configured to capture images (e.g., video and/or photos) of such a person at the entrance. The camera sensor, however, may not accurately focus on the person at the entrance, may not be able to determine certain characteristics (speed, distance, direction, etc.), may capture only part of a person or an object due to inaccuracy, or may otherwise produce poor quality images. Accordingly, the camera sensor may fail to detect an aspect of the person or the object at the entrance, including failing to detect the face of the person.

Aspects of the invention relate to systems, methods, and related devices for improving image-based, motion-based, and/or other monitoring via sonic detection and analysis. Detecting motion at an entrance of a premises may be improved by determining whether sonic information is detected separate from and/or in association with the detected motion and/or the related characteristics of the sonic information. Upon detecting a sound and/or a sonic signal, the systems and/or the methods may determine one or more aspects of the received sounds and/or sonic signal.

For example, the systems and methods may implement a passive and/or active sound sensor to determine a distance to the sound, a location of the sound, a type of sound, a direction associated with a source of the sound, a speed of a source of the sounds, a size of the source of the sounds, etc. In some cases, a direction associated with a source of the sonic signal may be determined. For example, upon determining an object such as a person made the sound, the system may sense the location of the person and track the person moving using a sonic signal. Accordingly, in some embodiments, motion detection false alarms may be eliminated and/or minimized by analyzing motion detection together with sound and/or sonic detection.

For example, a motion sensor may detect a tree moving in the motion sensor's field of view. The system may determine whether sound and/or movement of an object (via sonic sensing) is associated with the motion. Upon determining there is no sound associated with the detected motion or that certain results and/or characteristics have been associated with detected sounds data, the system may omit and/or perform generating a notification. In some cases, the system may determine whether the sound occurs within a predetermined distance of the sensor detecting the sound. Upon determining the sound satisfies this distance threshold, the system may perform one or more functions. For instance, upon determining the detected sound occurs within, for example, 10 feet or less of any sensor—including but not limited to the sound sensor—at least one element of the system such as the motion sensor may be set to trigger an alert upon detecting certain characteristics, events, data, and/or other information, such as motion. In another example, upon detecting motion the system may determine whether a sound is associated with the motion, including but not limited to comparing multiple sets of data and/or multiple types of data, correlating one or more data points and/or characteristics, comparing past historical data specific to this premises and/or others, and/or comparing learned sequences and situations. Upon determining a sound is associated with the motion, the system may determine whether the sound satisfies the distance threshold. Thus, as one example, if the sound is determined to be within the predetermined distance, a notification may be generated and/or sent. Otherwise, generating a notification may be omitted unless or until an associated sound is determined to satisfy the distance threshold and/or another characteristic.

In some embodiments, a camera sensor and/or motion sensor may be activated upon determining a presence and/or a movement on an object, such as a person. This determination may include whether the object is within the predetermined distance. In one embodiment, upon determining a detected object satisfies the distance threshold or moves within a designated area, an active sound sensor may be triggered to actively locate a source associated with the detected sound.

The active sound sensor may be configured to send out a sound ping (e.g., ultrasonic sound wave) and listen for an echo response to determine a distance, location, speed, gait, and/or size of a source associated with the detected sound. In some cases, the active sound sensor and/or another element of the system may be configured to track a location, a distance of, a movement direction, a facial recognition, a size, and/or other information of an object (like a person and/or a package). This sonic sensing may provide a sensor to help verify the accuracy of certain information, including information captured by other sensors (such as an image sensor).

In alternative embodiments, the active sound sensor may send out a sound pin and listen for an echo response before a motion sensor and/or other element of the system is activated. Thus, the sound sensor may provide the first detection, the second detection, and/or another detection method and related sound-sensing actions may performed before, during, and/or after other system related functions.

In some embodiments, upon detecting a sound, the systems and methods may include identifying a type of sound associated with the detected sound. Examples of identifiable types of sound may include a footstep, a voice, a horn of a vehicle, an engine of a vehicle, knocking on a door, ringing a doorbell, opening a gate door, rustling of clothing, an animal noise, and rattling of keys. Identifiable types of sounds may be identified based on a comparison to recorded sounds of the same type, based on frequency analysis, a correlation algorithm, etc. In some cases, a notification may be generated upon determining the detected sound includes at least one of a siren, breaking glass, a vehicle crash, a gunshot, and/or a sound associated with high winds.

In one embodiment, capturing images of a person and/or object located at the entrance to the premises may be improved by determining a location of the person and/or object via sound detection and analysis. For example, the systems and methods may include initiating an adjustment of an aspect of a focus window of a camera sensor based on the estimated location. A location of the detected sound may be determined in relation to a viewing area of a camera sensor. Thus, with a field of view divided into quadrants, as one example, a detected sound may be determined to be located relative to the upper left quadrant of the camera sensor's field of view, for example. In some cases, the systems and methods may include capturing an image of an area at the entrance of the premises using the adjusted aspect of the focus window. In some cases, the camera sensor may adjust an aspect of its view (e.g., aperture, field of view, depth of view, lens position, etc.) based on a determined location of the detected sound. In some cases, another element of the system such as a central control panel processing system may initiate an adjustment of the image sensor.

In some cases, a size of a source associated with the detected sound may enhance an aspect of the camera sensor's field of view and/or focus settings. For example, upon determining the detected sound satisfies the distance threshold, the camera sensor may be triggered to adjust its focus in relation to the estimated location of the detected sound. In some cases, an aspect of the camera sensor's field of view may be adjusted based at least in part on one or more of the estimated distance to the sound, an estimated location of a source of the sound, the identified type of the detected sound, and/or an estimated size of the source of the sound. For example, upon detecting a sound to be within the predetermined distance of the entrance of the premises and determining the sound is made by a certain object (e.g., a person, an animal, a car, etc.), the camera sensor may be triggered to adjust its field of view and/or focus to capture an image that is based on detecting one or more features, such as the face of the person at the entrance with the detection of the face being enhanced by the sound detection analysis. Accordingly, the detection of motion and/or capturing of images may be augmented by sound detection analysis.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, and/or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an IPOD®, an IPAD®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, the one or more sensor units 110 may be sensors configured to conduct periodic or ongoing automatic measurements related to audio and/or image data signals. Each sensor unit 110 may be capable of sensing multiple audio and/or image parameters, or alternatively, separate sensor units 110 may monitor separate audio and image parameters. For example, one sensor unit 110 may monitor audio (e.g., ultrasonic/supersonic, subsonic audio, active audio, passive audio, etc.), while another sensor unit 110 (or, in some embodiments, the same sensor unit 110) may detect images (e.g., photo, video, motion detection, infrared, etc.). In some embodiments, one or more sensor units 110 may additionally monitor alternate audio and/or image parameters, such as ultrasonic audio signals, passive audio signals, active audio signals, visual spectrum images, infrared images, etc.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer and/or smart phone. Where local computing device 115, 120 is a smart phone, the smart phone may have a dedicated application directed to collecting audio and/or video data and calculating object detection therefrom. The local computing device 115, 120 may process the data received from the one or more sensor units 110 to obtain a probability of an object within an area of a premises such as an object within a predetermined distance of an entrance to the premises as one example. In alternate embodiments, remote computing device 140 may process the data received from the one or more sensor units 110, via network 125 and server 155, to obtain a probability of detecting an object within the vicinity of an area of a premises, such as detecting a person at an entrance to the premises for example. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of passive audio data from a sensor unit 110, a stream of active audio data from the same or a different sensor unit 110, a stream of image (e.g., photo and/or video) data from either the same or yet another sensor unit 110, and a stream of motion data from either the same or yet another sensor unit 110.

In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory and/or through a wired and/or a wireless connection) containing audio and/or video data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
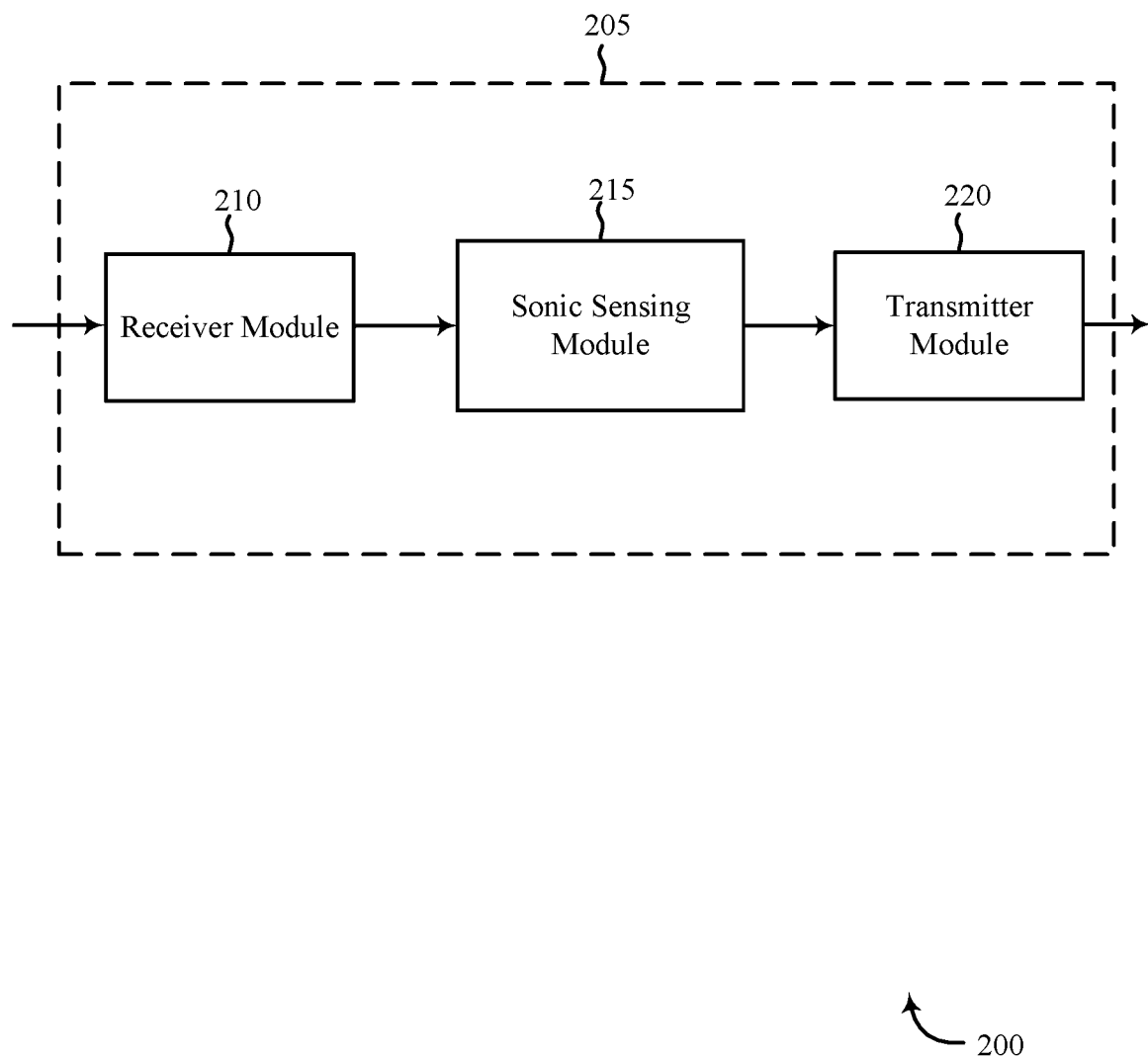
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 135 described with reference to FIG. 1. The apparatus 205 may include a receiver module 210, a sonic sensing module 215, and/or a transmitter module 220. The apparatus 205 may also be or include a processor. Each of these modules may be in communication with each other and/or other modules—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive audio signals and/or data (e.g., ultrasonic/supersonic, subsonic, passive and/or active audio signals) and/or image signals and/or data (e.g., photo images, video images, infrared images, videos, etc.). Information may be passed on to the sonic sensing module 215, and to other components of the apparatus 205.

The sonic sensing module 215 may be configured to analyze audio signals detected by an audio sensor. The audio signals may include ultrasonic audio, passively-detected audio, and/or actively-detected audio, among others. The sonic sensing module 215 may enhance object detection via analyzing image data detected by an image sensor based on the analysis of the detected audio signals. Accordingly, sonic sensing module 215 may analyze audio and image data streams in order to enhance the detection of objects relative to an area of a premises. For example, sonic sensing module 215 may enhance the capabilities of an image sensor to visually detect an object, focus on the object, determine a distance to, a speed of, and/or a location of the object, and/or determine a size of the object relative to a field of view of the image sensor, among other functions. Thus, based on analyzed audio signals and/or data, and/or image signals and/or data, sonic sensing module 215 may enable an image sensor to focus more quickly on a detected object, perform facial recognition more quickly, perform object tracking with less lag, etc.

The transmitter module 220 may transmit the one or more signals received from other components of the apparatus 205. The transmitter module 220 may transmit audio signals (e.g., ultrasonic/supersonic, passive and/or active audio signals) and/or image signals (e.g., photo images, video images, infrared images, etc.). In some cases, transmitter module 220 may transmit results of data analysis on audio and/or image signals (and/or data) analyzed by sonic sensing module 215. In some examples, the transmitter module 220 may be collocated with the receiver module 210 in a transceiver module. In other examples, these elements may not be collocated.

Figure 3:
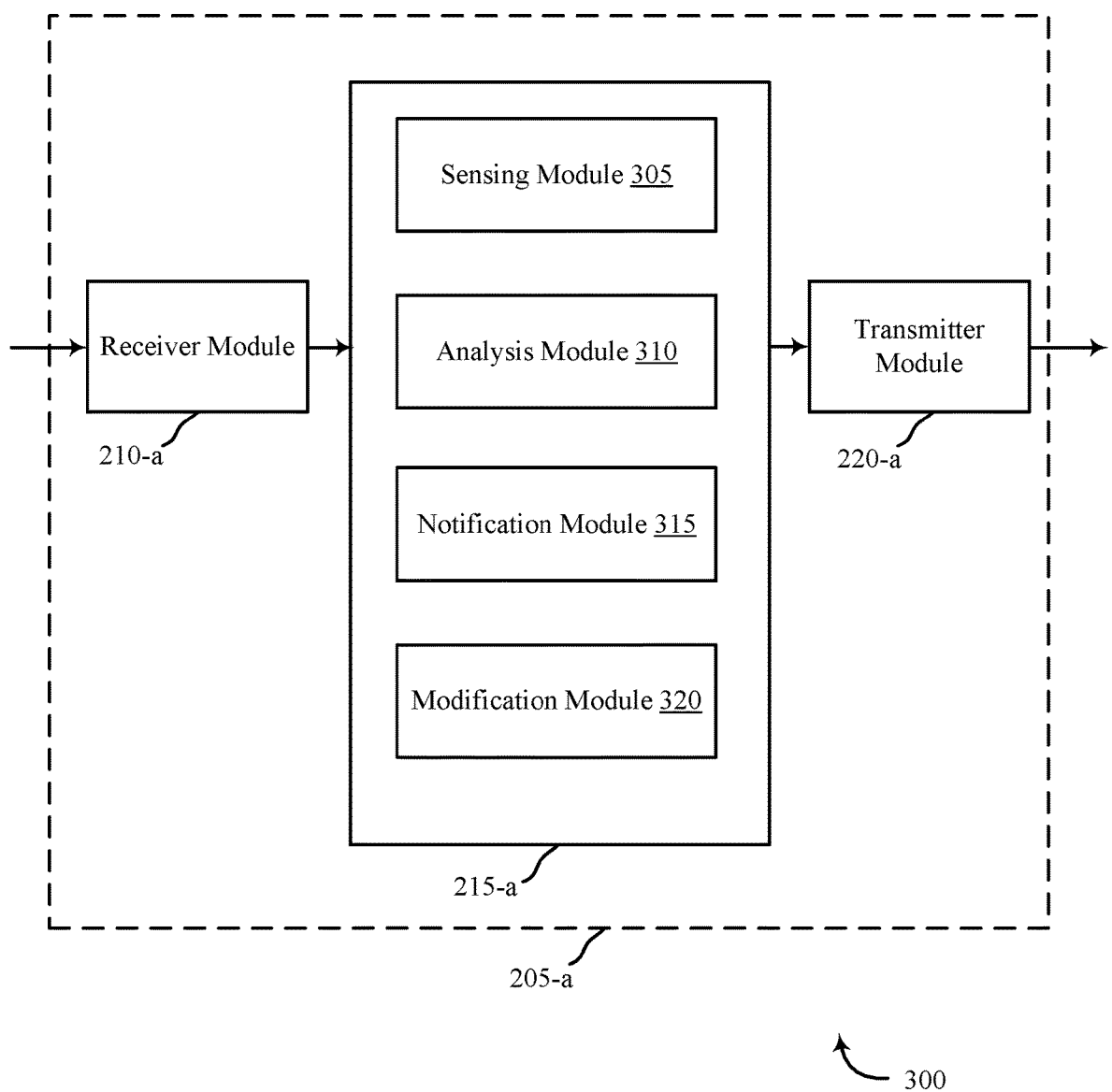
FIG. 3 shows a block diagram of a device relating to a security and/or an automation system, in accordance with various aspects of this disclosure.

FIG. 3 shows a block diagram 300 of an apparatus 205-a for use in wireless communication, in accordance with various examples. The apparatus 205-a may be an example of one or more aspects of a control panel 135 described with reference to FIG. 1. It may also be an example of an apparatus 205 described with reference to FIG. 2. The apparatus 205-a may include a receiver module 210-a, a sonic sensing module 215-a, and/or a transmitter module 220-a, which may be examples of the corresponding modules of apparatus 205. The apparatus 205-a may also include a processor. Each of these components may be in communication with each other. The sonic sensing module 215-a may include sensing module 305, analysis module 310, notification module 315, and/or modification module 320. The receiver module 210-a and the transmitter module 220-a may perform the functions of the receiver module 210 and the transmitter module 220, of FIG. 2, respectively.

In one embodiment, sensing module 305 may receive, via an image sensor, image data associated with an area of a premises such as a home, office, school, etc. For example, the image sensor may be configured to capture a view of an entrance to a premises. Similarly, sensing module 305 may receive sound data associated with an object via an audio sensor. Like the image sensor, the audio sensor (e.g., microphone, sonar device) may be configured to capture sound occurring within a given distance of one or more entrances and/or access points of the premises. In some cases, the audio sensor may detect various types of sound, including ultrasonic sound. The audio sensor may include an active audio sensor and/or a passive audio sensor. For example, in some embodiments, the audio sensor may listen for sounds detectable at the entrance of the premises.

Additionally, or alternatively, the audio sensor may generate a ping and emit the ping from the audio sensor and listen for an echo to the ping. In some embodiments, the sensing module 305 may detect motion and, upon detecting motion, trigger the audio sensor to monitor for sound. Additionally, or alternatively, sensing module 305 may detect a sound and trigger the image sensor to detect motion and/or objects. In some cases, sensing module 305 may detect a sound and estimate a distance to the sound in conjunction with analysis module 310, and upon determining the distance to the sound is within a predetermined distance, trigger the image sensor to detect motion and/or objects. In some embodiments, the system and/or method may incorporate one sensor that can detect, receive, process, and/or send multiple types of signals and/or data (audio, image, light, movement, etc.).

In one embodiment, analysis module 310 may analyze the image data detected by the image sensor in relation to the sound data detected by the audio sensor. The analysis module 310 may detect an object's presence based at least in part on this analysis. For example, the analysis module 310 may analyze the image data to determine whether an object moves and/or appears within the view of the image sensor. As an example, the image sensor may detect a tree moving in the distance and/or may detect a person approaching the entrance to the premises. The analysis module 310 may analyze the sound data to determine whether an object detected in the image data is likely human, whether the detected object is likely within a predetermined distance from the entrance, whether to generate a notification regarding the object, etc. For example, the audio sensor may detect a human voice, a non-human made sound, a sound determined to be made within 10 feet of the entrance, etc.

In some embodiments, modification module 320 may adjust at least one characteristic of an automation component based at least in part on determining whether the distance satisfies the distance threshold. In some embodiments, modification module 320 may initiate an adjustment of at least one characteristic of an automation component based at least in part on determining whether the distance satisfies the distance threshold. The automation component may include at least one of a motion sensor, the image sensor, a lock, a light, and/or an audio sensor.

In some embodiments, upon determining the estimated distance satisfies the distance threshold, the sensing module 305 may trigger an active sonic sensor to detect a source of the detected sound by sending out a ping and listening for an echo to the ping. In some embodiments, upon determining the estimated distance satisfies the distance threshold (e.g., distance is less than 10 feet from entrance, etc.), modification module 320 may trigger an automation component to monitor the area of the premises (e.g., activate motion detection, camera motion detection, etc.). In some embodiments, upon determining the estimated distance satisfies the distance threshold, notification module 315 may be triggered, by the analysis module 310, to generate one or more notifications.

In one embodiment, analysis module 310 may identify at least one characteristic relating to the object based at least in part on the detecting. For example, analysis module 310 may identify a type of detected sound. Identifiable types of sound may include a footstep, a voice, a horn of a vehicle, an engine of a vehicle (e.g., an engine idling nearby, an engine driving by, etc.), a knocking on a door, a ringing of a doorbell, an opening of a door, an opening of a gate, a rustling of clothing (e.g., corduroy, etc.), an animal-originated sound, a yell, a scream, a gunshot, breaking of glass such as a window, a rattling of keys, and/or the like. Upon identifying the type of the sound as being made by a human, analysis module 310 may analyze image data to recognize a face, body, appendage, carried package, clothing, physical characteristics (height, body type, weight, etc.).

In one embodiment, analysis module 310 may estimate a distance from the audio sensor to a detected sound associated with the object. In some cases, estimating the distance from the audio sensor to the detected sound may be based at least in part on identifying the type of the detected sound. In some embodiments, analysis module 310 may determine whether the distance satisfies a distance threshold, a speed threshold, a size threshold, and/or another threshold. For example, analysis module 310 may determine that an object is within 20 feet of the audio and/or image sensors. The image sensor may use this information to enhance and/or modify the operations of the image sensor. Sensing module 305 may capture image data of the area after the adjusting at least one characteristic of the image sensor. For example, based on the determination the object is within 20 feet of the image sensor, the image sensor may adjust one or more settings such as an adjustment of focus, aperture, field of view, hue, etc. For example, based on the determination the object is approaching at 6 miles per hour (or another value such as feet per second), the image sensor may adjust one or more settings such as an adjustment of focus, aperture, field of view, hue, etc.

In one embodiment, modification module 320 may adjust at least one characteristic of the image sensor based at least in part on the determined and/or the estimated distance. For example, modification module 320 may adjust an aspect of focus of the image sensor based on the estimated distance to the object. Sensing module 305 may then capture an image of the area of the premises using the adjusted aspect of the focus.

In one embodiment, analysis module 310 may estimate a location of an object that made the detected sound. For example, a location of the object may be estimated in relation to the field of view of the image sensor such as in the upper left quadrant of the image sensor's field of view, etc. In some cases, the location of the object may be estimated in relation to an area of the premises such as at the porch of the entrance of a premises, at a sidewalk some distance from the entrance, at a driveway and/or parking lot some distance from the entrance, etc. Additionally, or alternatively, a location of the object may be estimated in relation to the location of the audio sensor such as within 5 feet from the audio sensor, at an angle of 30 degrees, 45 degrees, and/or some other direction (relative to one or more sensor's relative position and/or based on compass direction) and to the left of the direction the audio sensor is pointed, etc. Analysis module 310 may determine at least one movement characteristic of the object based at least in part on at least one of the image data and the sound data.

In some cases, analysis module 310 may track a source of the detected sound based at least in part on a subsequent detected sound. For example, sensing module 305 may include stereo sonic sensors to enable analysis module 310 to track a location of the source of a detected sound and/or to determine a direction in which the source of the detected sound is headed. Additionally, or alternatively, the sensing module 305 may include one or more image tracking sensors, motion tracking sensors, infrared tracking sensors and/or one or more audio passive direction detection sensors, active sonic tracking sensors, and the like to enable analysis module 310 to estimate a location of an object and/or track the detected object.

In some cases, modification module 320 may adjust one or more settings of an image sensor based on the estimated location of the object. For example, modification module 320 may adjust an aspect of a focus window of the image sensor based on the estimated location of the object.

In one embodiment, notification module 315 may generate a notification based at least in part on determining the type of the detected sound. In some cases, the notification module 315 may work in conjunction with a virtual neighborhood watch where a sensor at a first location triggers a notification at the first location (a first premises) as well as a notification at a second location (second premises). Thus, upon determining a sound indicates a siren or an emergency response vehicle, breaking glass, a crash (automobile), a gunshot, a moderate wind, a high wind warning (e.g., sound of high wind, sound of debris smacking something, etc.), a scream, and/or another sounds.

An indication of moderate wind may improve the system to reduce false positives. For example, a tree in the distance and in the view of the image sensor may trigger movement detection in a moderate wind. The sensing module 305 detecting the moderate wind (e.g., rustling of leaves, etc.) with the tree moving in the distance and an absence of sound within a predetermined distance of the sound and/or image sensors may trigger the system to omit generating a notification regarding the detected object movement based at least in part due to the moderate wind, thus reducing false positive notifications.

In one embodiment, analysis module 310 may estimate a size of a source of the detected sound relative to a field of view of the image sensor based at least in part on at least one of the distance and/or the type of the detected sound, among other things. Data indicating the estimated size of the source of the detected sound may enhance the image sensor's ability to visually identify objects, focus on objects, track objects, etc. For example, the audio data indicating human speech indicates the source of the sound is human sized. In some embodiments, the audio data based on one characteristic or another may identify specific characteristics of the person, such as gender, age, etc. The audio data indicating a package being left at the entrance of the premises within view of the camera indicates the source of the sound is package sized, etc.

Figure 4:
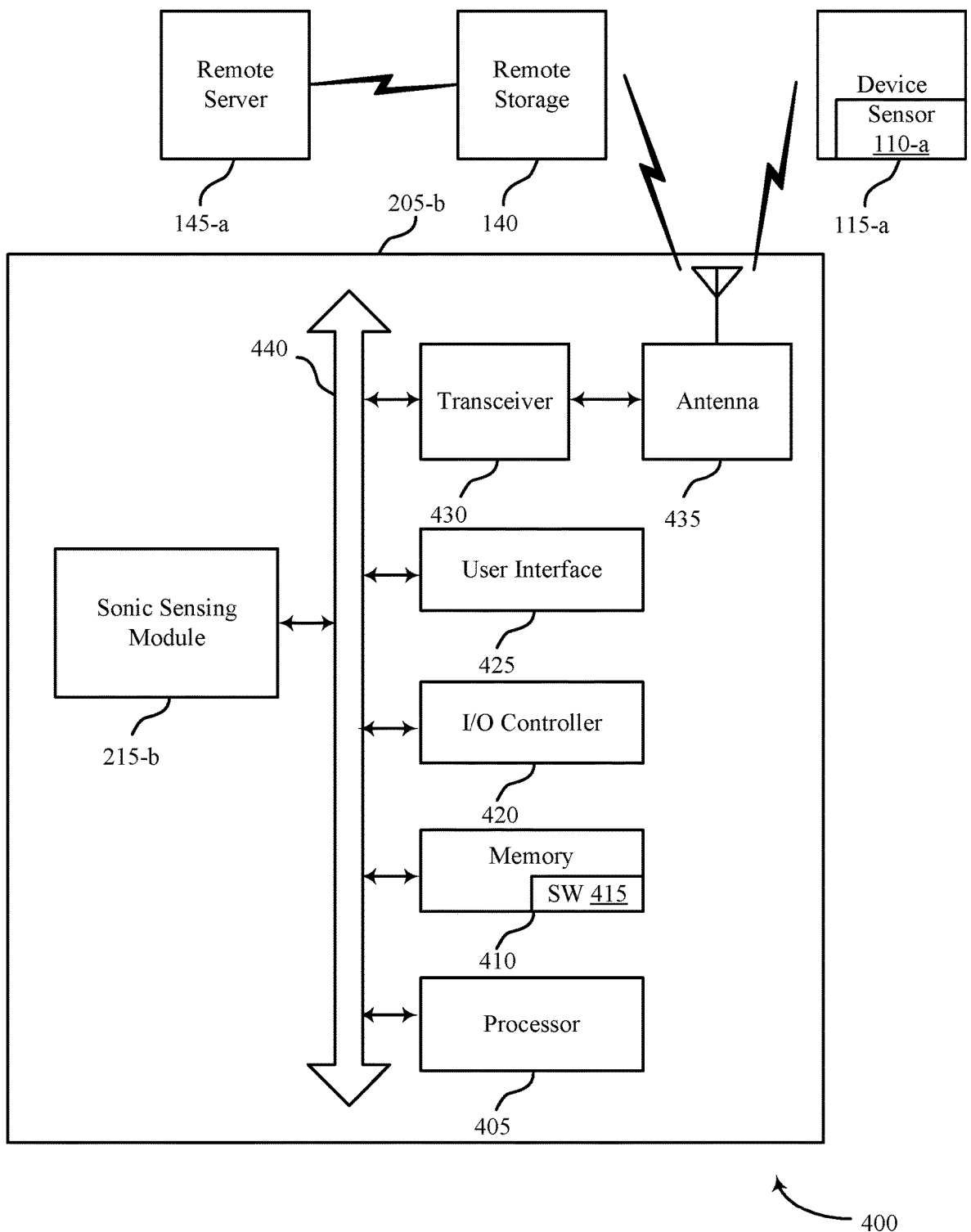
FIG. 4 shows a block diagram relating to a security and/or an automation system, in accordance with various aspects of this disclosure.

FIG. 4 shows a system 400 for use in sonic sensing systems, in accordance with various examples. System 400 may include an apparatus 205-b, which may be an example of the control panels 105 of FIG. 1. Apparatus 205-b may also be an example of one or more aspects of apparatus 205 and/or 205-a of FIGS. 2 and 3.

Apparatus 205-b may include components for bi-directional voice and data communications including components for transmitting communications and components for receiving communications. For example, apparatus 205-b may communicate bi-directionally with one or more of device 115-a, one or more sensors 110-a, remote storage 140, and/or remote server 145-a, which may be an example of the remote server of FIG. 1. This bi-directional communication may be direct (e.g., apparatus 205-b communicating directly with remote storage 140) and/or indirect (e.g., apparatus 205-b communicating indirectly with remote server 145-a through remote storage 140).

Apparatus 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-a, remote storage 140, and/or remote server 145-a. The transceiver module 430 may include a modem to modulate the packets and provide the modulated packets to the one or more antennas 435 for transmission, and to demodulate packets received from the one or more antenna 435. While a control panel or a control device (e.g., 205-b) may include a single antenna 435, the control panel or the control device may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a remote server 145-a via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 110-a (e.g., motion, proximity, smoke, light, glass break, door, audio, image, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., monitor for audio and image data at an entrance to a premises and analyze the image data in relation to the audio data to enhance the operation of an image sensor and/or to determine whether to generate a notification, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the sonic sensing module 215 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-b) may include a single antenna 435, the control panel or control device (e.g., 205-b) may have multiple antennas 435 capable of concurrently transmitting and/or receiving multiple wireless transmissions. The apparatus 205-b may include a sonic sensing module 215-b, which may perform the functions described above for the sonic sensing modules 215 of apparatus 205 of FIGS. 2 and 3.

Figure 5:
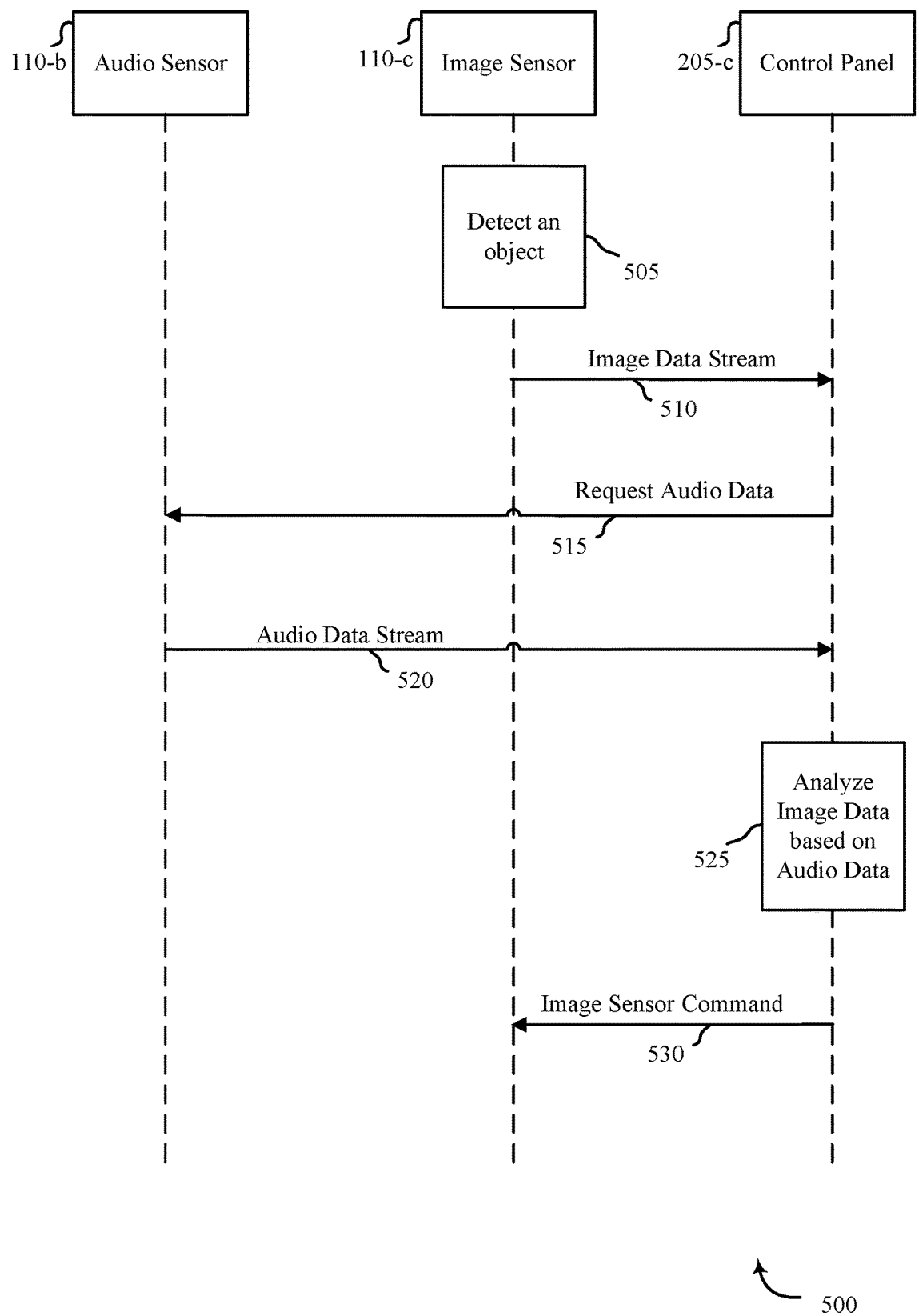
FIG. 5 shows a block diagram of a data flow relating to a security and/or an automation system, in accordance with various aspects of this disclosure.

FIG. 5 shows a block diagram of a data flow 500 relating to a security and/or an automation system, in accordance with various aspects of this disclosure. The data flow 500 illustrates the flow of data between an audio sensor 110-b, an image sensor 110-c, and an apparatus 205-c. The audio and/or image sensors 110 may be examples of one or more aspects of sensor 110 from FIGS. 1 and/or 4. Apparatus 205-c may be an example of one or more aspects of control panel 135 of FIG. 1, and/or apparatus 205 of FIGS. 2-4. In some cases, apparatus 205-c may include a computing device such as a smart phone, desktop, laptop, remote server (e.g., server 155 of FIG. 1). In some cases, apparatus 205-c may include a storage device and/or database.

At block 505, image sensor 110-c may detect an object. Image sensor 110-c may send image data 510 based on the object detected at block 505. The image data 510 may include infrared image data, visual spectrum image data (e.g., photos and/or videos), thermal image data, motion sense data, and/or the like. The apparatus 205-c may analyze the image data 510 for object detection, object identification, facial recognition, etc. Image data 510 may include an image just prior to detection, one or more images upon detection and/or one or more images after detection. The detection may be based on infrared detection, passive motion sensing, active motion sensing, image comparison, etc. As illustrated, apparatus 205-c may send a request 515 to the audio sensor 110-b.

The request 515 may include a request for audio data generated by audio sensor 110-b. In response to the request 515, audio sensor 110-b may send audio data 520 to apparatus 205-c. The audio data 520 may include audio data before, at the time, and/or after the time image sensor 110-c detects an object at block 505. The audio sensor 110-b may generate audio data based on passive audio detection and/or active audio detection. Audio sensor 110-b may be configured to generate and/or detect in the infrasound, acoustic, and/or ultrasound ranges. Accordingly, the audio data 520 may include audio data from passive detection, active detection, and/or audio data in the infrasound, acoustic, and/or ultrasound ranges.

Although data flow 500 illustrates apparatus 205-c receiving audio data 520 in response to sending request 515, in some embodiments, audio sensor 110-b may send an audio data stream to apparatus 205-c regardless of a request for audio data. For example, audio sensor 11-b may send audio data to apparatus 205-c on a recurring basis such as at a predetermined rate (e.g., a sample of audio data sent every second, every five seconds, etc.). In some cases, audio sensor 110-b may send audio data to apparatus 205-c upon determining image sensor 110-c detects an object. In some cases, image sensor 110-c may send a notification to audio sensor 110-b indicating an object is detected. In some cases, audio sensor 110-b may monitor image sensor 110-c to determine an object is detected.

Apparatus 205-c may analyze the image data 510 in conjunction with the audio data 520. For example, apparatus 205-c may determine, based on audio data 520, whether the detected object is within a certain distance of audio and/or image sensors 110, a location of the detected object, a size of the detected object relative to its determined distance, a size of the detected object relative to a field of view of image sensor 110-c, etc.

Based on the analysis of block 525, apparatus 205-c may send an image sensor command 530 to image sensor 110-c. The command 530 may include instructions for image sensor 110-c and/or some other element of the system to perform one or more functions. For example, the command may instruct image sensor 110-c to adjust a focus, to adjust a field of view, to adjust an aperture, to adjust a resolution, etc. In some cases, command 530 may include result data based on the analysis of the image data 510 and/or audio data 520.

The result data may provide information to enable the image sensor 110-c to identify the detected object, to focus on the detected object, to determine a distance to the object, to track the object, to determine a size of the object relative to its determined distance and/or relative to a field of view of the image sensor 110-c, to determine the object is a person, to perform facial recognition on the person, and the like. In some cases, apparatus 205-c may notify image sensor 110-c that, based on the analysis of the image data 510 and/or audio data 520, the object detection is a false alarm. Thus, command 530 may instruct image sensor 110-c to disregard the detected object. In some cases, apparatus 205-c may generate a notification indicating that an object was detected via the image sensor 110-c. For example, the analysis of the image data 510 and/or audio data 520 may indicate that a person is at a front door of a premises, that a vehicle is in a drive way of the premises, that a package has been delivered to the premises, etc.

In some embodiments, the one or more steps and/or actions described and shown in FIG. 5 may be performed in various orders and/or by various elements. For example, the system may use audio sensor 110-b to initially detect an object and then request additional data from the image sensor 110-c (as opposed to initial detection by the image sensor 110-c and requesting additional data from audio sensor 110-b).

Figure 6:
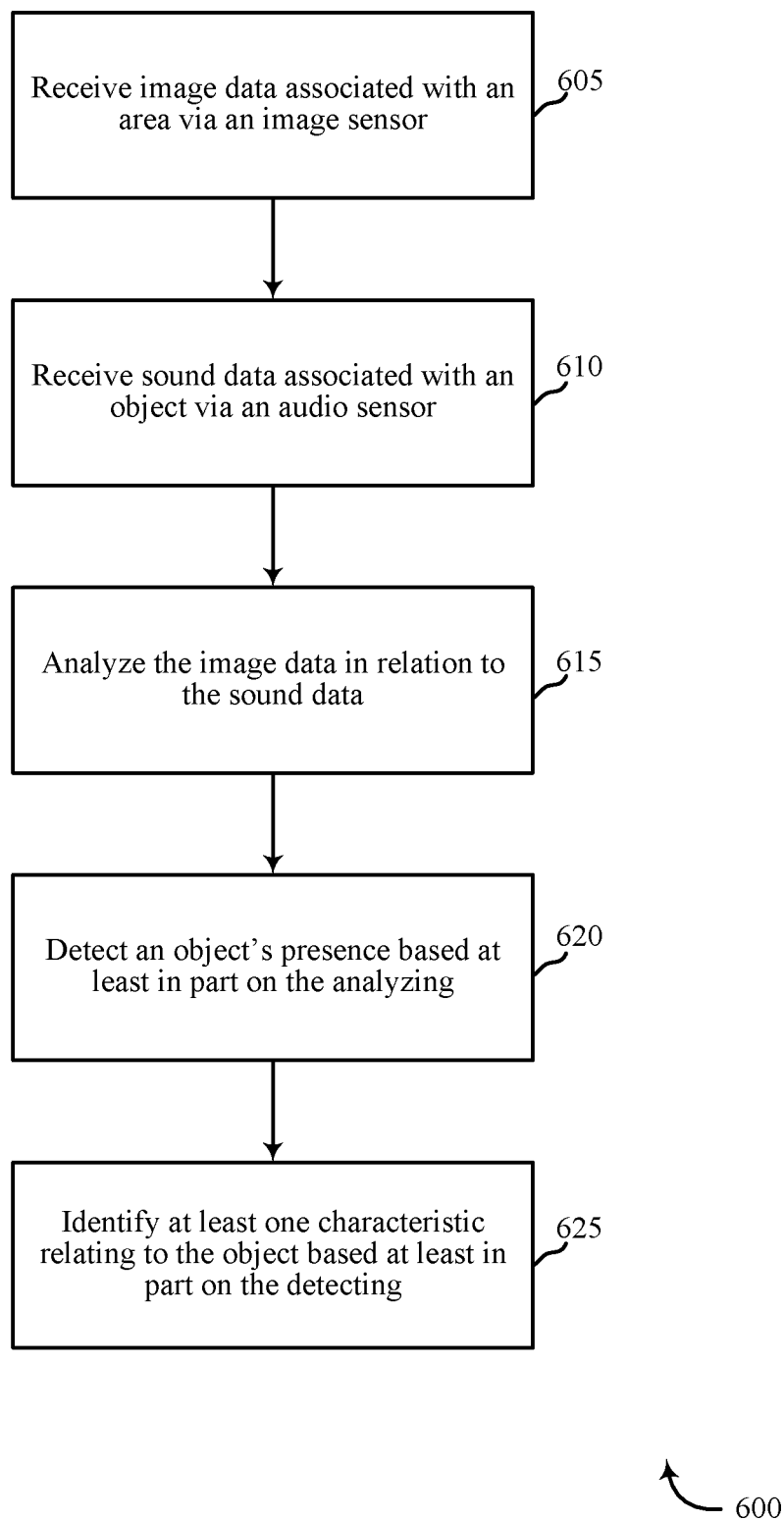
FIG. 6 is a flow chart illustrating an example of a method relating to a security and/or an automation system, in accordance with various aspects of this disclosure.

FIG. 6 is a flow chart illustrating an example of a method 600 for sonic sensing, in accordance with various aspects of the present disclosure. For clarity, the method 600 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 605, image data associated with an area via an image sensor may be received. For example, a camera at an entrance to a premises may capture images (e.g., photo and/or video images) of the entrance to the premises. At block 610, sound data associated with an object may be received via an audio sensor. The entrance to the premises may include an audio sensor (e.g., microphone, etc.) to detect sounds relative to the entrance. At block 615, the image data may be analyzed in relation to the sound data. At block 620, an object's presence may be detected based at least in part on the analyzing. At block 625, at least one characteristic relating to the object may be identified based at least in part on the detecting. The operation(s) at block 605-625 may be performed using the sonic sensing module 215 described with reference to FIGS. 2-4 and/or another module.

Thus, the method 600 may provide for sonic sensing relating to automation/security systems. It should be noted that the method 600 is just one implementation and that the operations of the method 600 may be rearranged, omitted, and/or otherwise modified such that other implementations are possible and contemplated.

Figure 7:
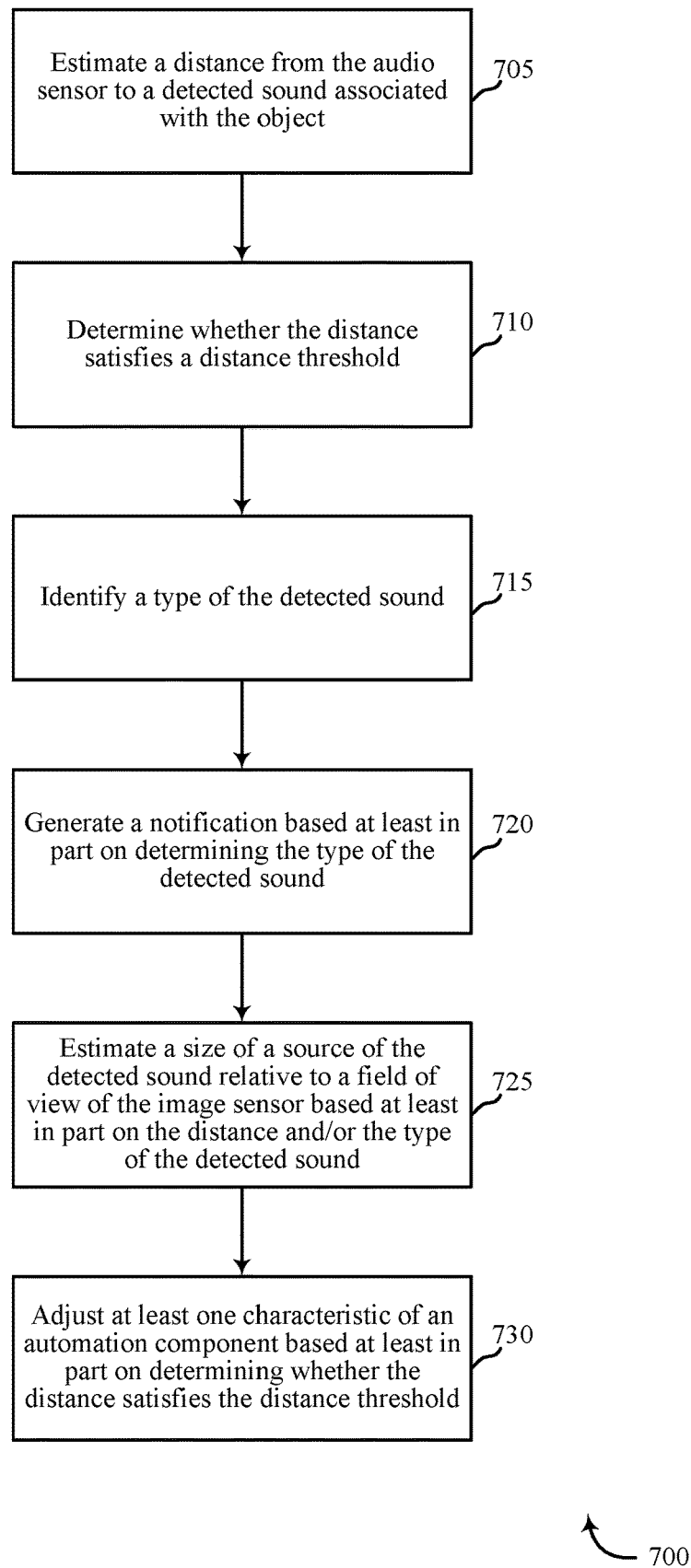
FIG. 7 is a flow chart illustrating an example of a method relating to a security and/or an automation system, in accordance with various aspects of this disclosure.

FIG. 7 is a flow chart illustrating an example of a method 700 for sonic sensing, in accordance with various aspects of the present disclosure. For clarity, the method 700 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 705, a distance from the audio sensor to a detected sound associated with the object may be estimated (solely or in conjunction with one or more other characteristics such as speed, size, etc.). In some cases, the audio sensor may detect ultrasonic sound. At block 710, whether the distance satisfies a distance threshold may be determined. At block 715, a type of the detected sound may be identified. Identifiable types of sound may include at least a footstep, a voice, a horn of a vehicle, an engine of a vehicle, a knocking on a door, a ringing of a doorbell, an opening of a door, a rustling of clothing, a gunshot, a glass breaking, a rattling of keys, and/or the like. At block 720, a notification may be generated based at least in part on determining the type of the detected sound. Estimating the distance from the audio sensor to the detected sound may be based at least in part on identifying the type of the detected sound, among other things. At block 725, a size of a source of the detected sound relative to a field of view of the image sensor may be estimated based at least in part on the estimated distance to the detected sound and/or the determined type of the detected sound. At block 730, at least one characteristic of an automation component may be adjusted based at least in part on determining whether the distance satisfies the distance threshold. The automation component may include at least one of a motion sensor, the image sensor, a lock, a light, and/or the audio sensor. In some cases, the audio sensor may include an active audio sensor, while in other cases the audio sensor may include a passive audio sensor, and/or some of each. The operations at blocks 705-730 may be performed using the sonic sensing module 215 described with reference to FIGS. 2-4 and/or another module.

Thus, the method 700 may provide for sonic sensing relating to automation/security systems. It should be noted that the method 700 is just one implementation and that the operations of the method 700 may be rearranged, omitted, and/or otherwise modified such that other implementations are possible and contemplated.

Figure 8:
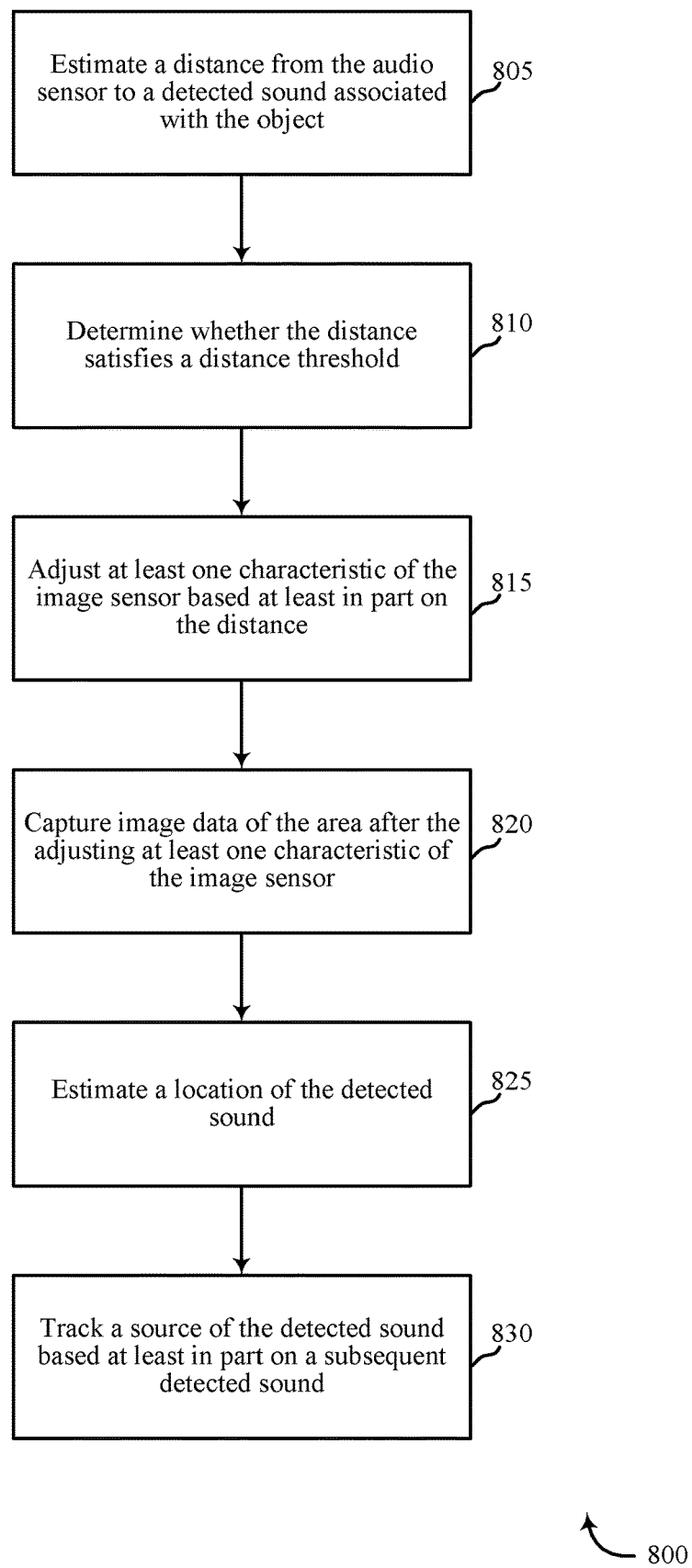
FIG. 8 is a flow chart illustrating an example of a method relating to a security and/or an automation system, in accordance with various aspects of this disclosure.

FIG. 8 is a flow chart illustrating an example of a method 800 for sonic sensing, in accordance with various aspects of the present disclosure. For clarity, the method 800 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 805, a distance from the audio sensor to a detected sound associated with the object may be estimated. In some cases, the audio sensor may detect ultrasonic sound. At block 810, whether the distance satisfies a distance threshold may be determined. At block 815, at least one characteristic of the image sensor may be adjusted based at least in part on the distance. Characteristics of the image sensor that may be adjusted include focus, field of view, focus window, aperture, image quality, and the like. At block 820, image data of the area may be captured after the adjusting at least one characteristic of the image sensor. At block 825, a location of the detected sound may be estimated. At block 830, a source of the detected sound may be tracked based at least in part on a subsequent detected sound. The operations at blocks 805-830 may be performed using the sonic sensing module 215 described with reference to FIGS. 2-4 and/or another module.

Thus, the method 800 may provide for sonic sensing relating to automation/security systems. It should be noted that the method 800 is just one implementation and that the operations of the method 800 may be rearranged, omitted, and/or otherwise modified such that other implementations are possible and contemplated.

In some examples, aspects from two or more of the methods 600, 700, and 800 may be combined and/or separated. It should be noted that the methods 600, 700, and 800 are just example implementations, and that the operations of the methods 600, 700, and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems at a premises, comprising:
receiving image data associated with an area of the premises via an image sensor located at the premises;
determining that the image data includes a partial image of an object;
receiving sound data associated with the object via an audio sensor located at the premises;
analyzing the sound data to determine a detected sound;
analyzing the image data in relation to the sound data;
estimating a size of the object based at least in part on a type of sound indicated by the sound data and analyzing the image data in relation to the sound data;
estimating a distance from the audio sensor to the detected sound based at least on the analysis of the sound data;
determining whether the estimated distance satisfies a distance threshold; and
adjusting a field of view and a focus of the image sensor based at least in part on the estimated size of the object, the partial image of the object, and whether the estimated distance satisfies the distance threshold.

2. The method of claim 1, further comprising:
detecting a presence of the object within the area based at least in part on an analysis of the image data.

3. The method of claim 1, further comprising:
determining whether the estimated distance satisfies a size threshold, wherein adjusting the field of view and the focus of the image sensor is further based at least in part on the whether the estimated distance satisfies the size threshold.

4. The method of claim 1, further comprising:
detecting a sound within the sound data, wherein the detected sound includes one of a footstep, a voice, a horn of a vehicle, an engine of the vehicle, a knocking on a door, a ringing of a doorbell, an opening of the door, a rustling of clothing, a gunshot, a glass breaking, a rattling of keys, or a combination thereof.

5. The method of claim 4, further comprising:
determining the type of sound based at least in part on detecting the sound within the sound data; and
estimating a distance from the audio sensor to the detected sound based at least in part on determining the type of sound.

6. The method of claim 5, wherein estimating the size of the object further comprises:
estimating the size of the object relative to the field of view of the image sensor based at least in part on at least one of the estimated distance and the type of sound.

7. The method of claim 1, further comprising:
capturing image data of the area after adjusting the field of view of the image sensor.

8. The method of claim 1, further comprising:
analyzing the sound data to determine a detected sound; and
estimating a location of the detected sound.

9. The method of claim 8, further comprising:
tracking a source of the detected sound based at least in part on a subsequent detected sound.

10. An apparatus for an automation system, comprising:
a processor;
memory in electronic communication with the processor; and
instructions stored in the memory, the instructions being executable by the processor to:
receive image data associated with an area of a premises via an image sensor located at the premises;
determine that the image data includes a partial image of an object;
receive sound data associated with the object via an audio sensor located at the premises;
analyze the sound data to determine a detected sound;
analyze the image data in relation to the sound data;
estimate a size of the object based at least in part on a type of sound indicated by the sound data and analyzing the image data in relation to the sound data;
estimate a distance from the audio sensor to the detected sound based at least on the analysis of the sound data;
determine whether the estimated distance satisfies a distance threshold; and
adjust a field of view and a focus of the image sensor based at least in part on the estimated size of the object, the partial image of the object, and whether the estimated distance satisfies a distance threshold.

11. The apparatus of claim 10, the instructions being further executable by the processor to:
detect a presence of the object within the area based at least in part on an analysis of the image data.

12. The apparatus of claim 10, the instructions being further executable by the processor to:
determine whether the estimated distance satisfies a size threshold, wherein adjusting the field of view and the focus of the image sensor is further based at least in part on the whether the estimated distance satisfies the size threshold.

13. The apparatus of claim 10, the instructions being further executable by the processor to:
identify a false positive associated with a presence of the object within the area based at least in part on analyzing the image data and analyzing the sound data; and
determine whether to generate a notification based at least in part on analyzing the sound data, the identified false positive, and the presence of the object within the area.

14. A non-transitory computer-readable medium storing computer-executable code for an automation system, the code executable by a processor to:
receive image data associated with an area of a premises via an image sensor located at the premises;
determine that the image data includes a partial image of an object;
receive sound data associated with the object via an audio sensor located at the premises;
analyze the sound data to determine a detected sound;
analyze the image data in relation to the sound data;
estimate a size of the object based at least in part on a type of sound indicated by the sound data and analyzing the image data in relation to the sound data;
estimate a distance from the audio sensor to the detected sound based at least on the analysis of the sound data;
determine whether the estimated distance satisfies a distance threshold; and
adjust a field of view and a focus of the image sensor based at least in part on the estimated size of the object, the partial image of the object, and whether the estimated distance satisfies the distance threshold.

15. The method of claim 1, further comprising:

identifying a false positive associated with a presence of the object within the area based at least in part on analyzing the image data and analyzing the sound data; and determining whether to generate a notification based at least in part on analyzing the sound data, the identified false positive, and the presence of the object within the area.

\* \* \* \* \*